Oct. 7, 1958 G. F. SCHROEDER ET AL 2,855,148
ELECTRIC MULTIPLIER FOR ANALOG COMPUTERS
Filed May 11, 1956
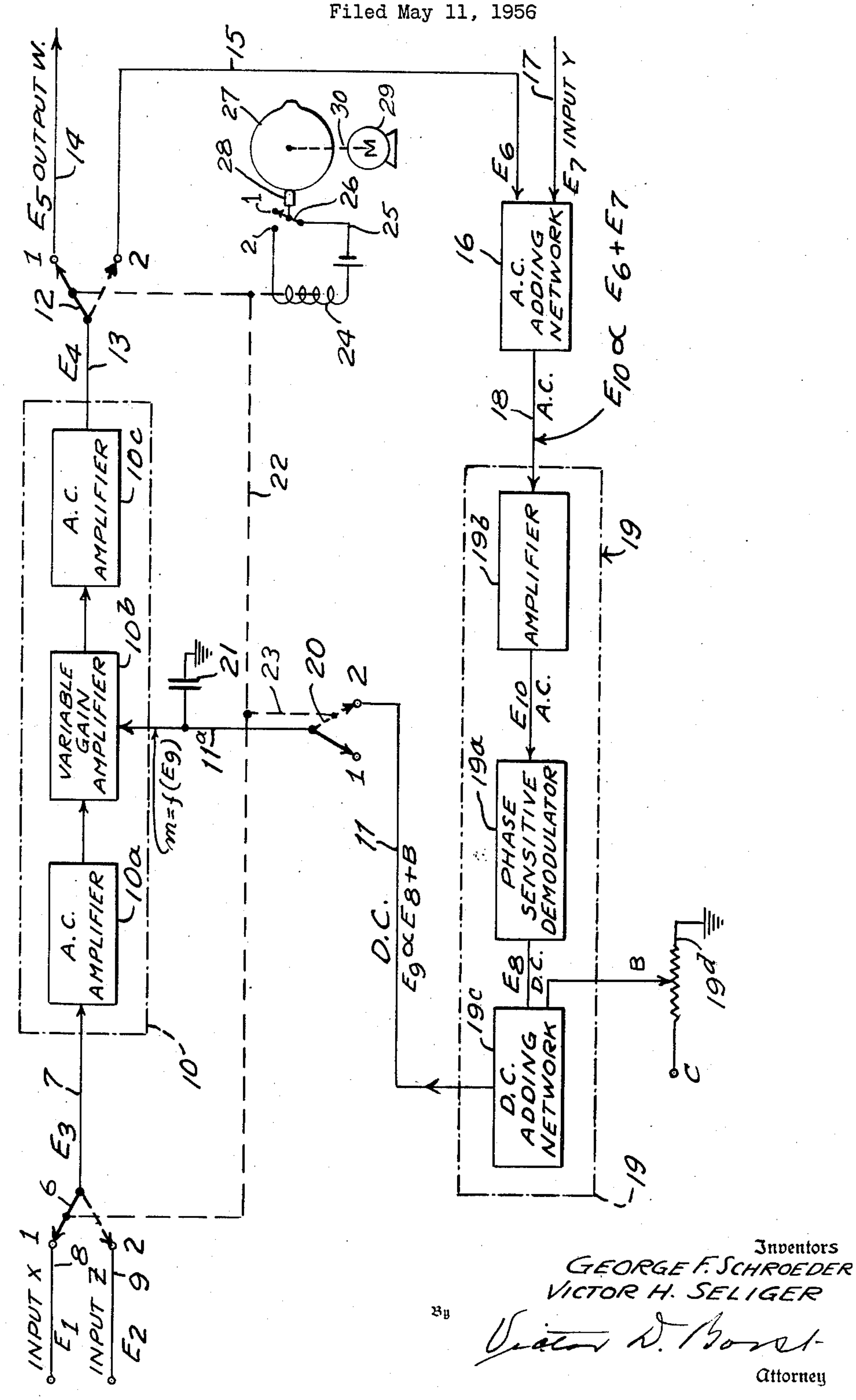
Inventors
GEORGE F. SCHROEDER
VICTOR H. SELIGER
By Victor D. Borst
Attorney United States Patent Office 2,855,148

Patented Oct. 7, 1958

2,855,148

ELECTRIC MULTIPLIER FOR ANALOG COMPUTERS

George F. Schroeder, West Hempstead, and Victor H. Seliger, Forest Hills, N. Y., assignors to Sperry Rand Corporation, Ford Instrument Company Division, Long Island City, N. Y., a corporation of Delaware Application May 11, 1956, Serial No. 584,355

5 Claims. (Cl. 235—61)

This invention relates to an electric device adapted for use with analog computers which can multiply and divide electrical analogs directly without converting to their mechanical equivalents.

Generally, the multiplier-divider is adapted to receive three electrical analogs representing known input quantities and includes a standard variable gain amplifier the modification factor of which is established as a ratio of two of the known inputs, the ratio being determined by the computer. The two inputs are thus employed by the amplifier to control the third input so that its output is a function of all three inputs.

One object of the present invention therefore is to provide a computer which performs multiplication and division of electrical analogs.

Another object of the invention is to provide an electric computer having a minimum of mechanical parts and hence is a durable unit economical to produce.

A further object of the invention is to provide a computer which is adapted to perform multiplication, division or multiplication and division of electrical analogs in one simultaneous operation after being properly adjusted.

Still another object of the invention is to provide a multiplier-divider which is compact, is not frequency sensitive and requires no critical phase-detecting devices or filters.

Other objects and advantages of the invention may be apparent on reading the detailed description in conjunction with the accompanying figure which is a schematic of the general computer arrangement.

Referring to the drawing, a switch 6 connects lead 7 selectively to input leads 8 and 9. The lead 7 feeds an A. C. voltage placed on the input leads to a variable gain amplifier 10, which comprises a constant gain A. C. amplifier 10$^a$, a variable gain amplifier 10$^b$ and a constant gain A. C. amplifier 10$^c$. The multiplication factor of the amplifier 10 is controlled by a D. C. voltage placed therein on lead 11$^a$. A second switch 12 selectively connects output lead 13 of the amplifier 10 to output lead 14 or to lead 15 which places the output of the amplifier 10 into an adding network 16. A third input lead 17 also feeds an A. C. voltage to an input side of the network box 16 where the two quantities are summed algebraically.

An output lead 18 connects the output side of the adding network to a feedback regulator 19. The output $E_{10}$ from the network has an amplitude proportional to the differeence between the two A. C. inputs and agrees in phase with the phase of the larger input voltage. The regulator 19 includes a phase sensitive demodulator 19$^a$, an amplifier 19$^b$ and a D. C. adding network 19$^c$ one leg of which is biased by a voltage B supplied by the potentiometer 19$^d$, the voltage B being proportional to a reference voltage C. The output of regulator 19 is connected to the amplifier 10 by lead 11, switch 20 and lead 11$^a$. A capacitor 21 is connected between lead 11$^a$ and ground.

The switches are operated synchronously by means of shaft 22 which connects switch 6 to switch 12 and shaft 23 which connects the shaft 22 to switch 20. The shaft

22 is driven by relay 24 in a battery circuit 25. A circuit breaking device 26 is provided in the circuit 25 and has an open contact 1 and close contact 2 corresponding to switch contacts 1 and 2 in the main computer line. The device 26 is operated by cam 27 and follower 28. A motor 29 drives the cam at constant speed through shaft 30. Preferably the cam has a twenty to one ratio whereby the switches are left in position 1 twenty times as long as position 2, the ratio being arrived at empirically.

The operation of the device is as follows: With the switch 6 in position 2, the analog voltage $E_2$ becomes $E_3$ on lead 7 and is placed into the amplifier 10, the voltage $E_3$ being an alternating voltage of some carrier frequency in the general frequency range of the amplifier 10 and a magnitude which is proportional to input Z. The amplifier output voltage $E_4$ is equal to $E_3$ multiplied by M, a function of $E_9$ on lead 11$^a$. With the switch 12 in position 2, $E_4$ becomes $E_6$ on lead 15 and is introduced to the network box 16 with an A. C. analog voltage $E_7$ on lead 17. $E_7$ is in 180° phase opposition to the voltage $E_6$ and is proportional to input Y. The adding network 16 is an electrical adding network having an output voltage $E_{10}$, which is proportional to the algebraic sum of the voltages $E_6$ and $E_7$ and assumes the phase of the higher of these voltages. The A. C. voltage $E_{10}$ is amplified by amplifier 19$^b$ and is converted by phase sensitive demodulator 19$^a$ to a D. C. voltage $E_8$ whose polarity depends on the phase of the voltage $E_{10}$. The demodulator output $E_8$ is introduced to the network box 19$^c$ with a voltage B which is proportional to the reference voltage C. The adding network 19$^c$ is an electrical D. C. adding network having an output voltage $E_9$ on lead 11, and is proportional to the algebraic sum of the voltages $E_8$ and B and assumes the polarity of the higher of these voltages. With the switch 20 in closed position 2, $E_9$, biased by capacitor 21 becomes the variable multiplication factor M on lead 11*a*. This establishes a new ratio between the voltages $E_3$ and $E_4$. The potential $E_9$ is applied to the capacitor 21 while it is being adjusted by the unit 19 until the network input $E_6$ is equal to the other network input $E_7$. At this point $mE_2$ is equal to $-E_7$ which may be demonstrated as follows:

(1) $E_2=E_3$ (2) $E_4=mE_3$, where $m=f(E_9)$ (3) $E_6=E_4$ (4) $E_6+E_7=0$ (5) $E_7+mE_2=0$ or $m=-E_7/E_2$ When the switching devices are thrown to position 1, the multiplication factor, *m*, is momentarily held constant by the capacitor 21. The analog voltage $E_1$ corresponding to input X now becomes $E_3$ which is amplified by the amplifier 10 whose voltage output $E_4$ is related to the input voltage $E_3$ in terms of the previously established value for *m*. The output $E_5$ then becomes a function of the three inputs as follows:

(6) $E_5=mE_1$ (5) $m=-E_7/E_2$ (7) $$E_5=\frac{-E_1E_7}{E_2}$$

Employing the usual type of analog representation of quantities by voltages, such as $E_1=k_1X$, $E_2=k_2Z$, $E_7=k_3Y$ and $E_5=k_4W$, we find from Equation 7:

(8) $$k_4W=\frac{-k_1k_3XY}{k_2Z} \text{ or } W=K\frac{XY}{Z}$$

Thus, a multiplication, a division, or a simultaneous computation of multiplication and division can be performed by the device. The computer may employ any of a variety of types of electronic or mechanical switches. In particular, transistor controlled electronic switches or mechanical switches consisting of commutating bars mounted on a common shaft would have the advantage of automatic synchronization. A mechanical switch arrangement is indicated by the dash lines in the figure. Several sets of such bars serving several such multipliers could be maintained on one shaft or series of shafts.

It is understood that the described embodiment is merely illustrative of inventive principle, and the invention should not be limited thereto except as it is defined in the appended claims.

What is claimed is:

1. An electric multiplier-divider comprising a variable gain amplifier, switching means for selectively placing a pair of input voltages into said amplifier, output means, an adding network, a second switching means adapted to selectively place the output of said variable gain amplifier into said adding network or said output means, means for introducing a third input voltage into said adding network for comparison with the output of the amplifier, a feedback regulator connected to the output of said adding network, said regulator including in series an amplifier, a phase sensitive demodulator, a second adding network, a potentiometer and a voltage supply referencing said potentiometer, a lead for placing the output of said regulator into said variable gain amplifier, a third switching means connected into said lead for making or breaking the circuit in said lead, an energy storing device disposed between said lead and ground, and a means for operating said switches in synchronism.

2. A multiplier-divider as claimed in claim 1 wherein said amplifier comprises a first gain amplifier, a variable gain amplifier and a second gain amplifier.

3. A multiplier-divider as claimed in claim 2 wherein said feedback regulator comprises an amplifier, a phase sensitive demodulator, and an adding network and a potentiometer is connected between a reference voltage supply and ground with its movable arm connected to one leg of said network.

4. A multiplier-divider as claimed in claim 3 wherein said energy storing means is a capacitor.

5. A multiplier-divider as claimed in claim 1 wherein said means for operating said switches is a relay.

References Cited in the file of this patent

UNITED STATES PATENTS

| | | |
|---|---|---|
| 2,425,405 | Vance | Aug. 12, 1947 |
| 2,497,883 | Harris | Feb. 21, 1950 |
| 2,770,771 | Schuster | Nov. 13, 1956 |

OTHER REFERENCES

Electronic Analog Computers (Korn and Korn) 1952, pages 228 and 229.